United States Patent [19]

Sorathia et al.

[11] Patent Number: 5,225,498
[45] Date of Patent: Jul. 6, 1993

[54] INTERPENETRATING POLYMER NETWORK ACOUSTIC DAMPING MATERIAL

[75] Inventors: Usman A. Sorathia, Arnold; William L. Yeager, Queen Anne; Timothy L. Dapp, Bowie, all of

[73] Assignee: The United States of America as represented by the Secretary of the Navy, Washington, D.C.

[21] Appl. No.: 750,992

[22] Filed: Aug. 28, 1991

[51] Int. Cl.[5] ............................................. C08F 18/04
[52] U.S. Cl. ...................................... 525/454; 525/28; 525/131; 525/455; 525/903; 528/75; 528/76; 528/112
[58] Field of Search .................... 525/454, 455, 903

[56] References Cited

U.S. PATENT DOCUMENTS

| | | | |
|---|---|---|---|
| 4,532,316 | 7/1985 | Henn | 528/59 |
| 4,824,919 | 4/1989 | Baker et al. | 525/502 |
| 4,857,579 | 8/1989 | Domeier | 524/507 |
| 5,102,924 | 4/1992 | Williams et al. | 522/4 |
| 5,110,867 | 5/1992 | Schutyser et al. | 525/114 |

Primary Examiner—James J. Seidleck
Assistant Examiner—Mary Critharis
Attorney, Agent, or Firm—Luther Marsh; Gary G. Borda

[57] ABSTRACT

Improved acoustic damping materials comprise interpenetrating polymer networks having a soft polymer component and a hard polymer component. The soft polymer component, constituting from 50 to 90, preferably 70, percent by weight of the material, is made by polymerizing an aromatic diisocyanate with a polyalkylene ether glycol, and the hard polymer component is a vinyl ester polymer made by polymerization of a vinyl ester resin such as the acrylate or methacrylate ester of the diglycidyl ether of a polyphenol. Optionally, the vinyl ester resin may be brominated, whereby increased fire retardance is conferred upon the interpenetrating polymer network. The mixture is cured at room temperature.

8 Claims, 1 Drawing Sheet

INTERPENETRATING POLYMER NETWORK ACOUSTIC DAMPING MATERIAL

The invention described herein may be manufactured and used by or for the Government of the United States for governmental purposes without the payment of any royalties theron or therefor.

BACKGROUND OF THE INVENTION

1. Field of Invention

This invention relates to polymer compositions, and methods of preparing them, having improved acoustic damping properties. More specifically, it relates to polymer mixtures comprising two components, a soft polymer component and a hard polymer component, which are intimately mixed on a molecular scale, such mixtures being referred to as "interpenetrating polymer networks."

2. Description of the Prior Art

Interpenetrating polymer networks having improved acoustic damping characteristics are known to the art.

U.S. Pat. No. 3,833,404 discloses interpenetrating polymer networks to be used for surface layers or coatings for damping vibrations or noise-emitting surfaces. The material consists of poly ethylacrylate cross-linked with a polyglycol dimethacrylate, and polystyrene cross-linked with divinylbenzene.

U.S. Pat. No. 4,302,553 discloses a number of interpenetrating polymer networks having improved tensile strength and swelling properties in presence of solvents, including combinations of polyurethanes with polyacrylates, polyepoxides, polyesters, styrene-butadiene polymers and polydimethyl siloxanes.

U.S. Pat. No. 4,342,793 describes curable resin compositions for protective surface coatings consisting of interpenetrating polymer networks prepared from saturated polyols, acrylate and methacrylate esters, and polyisocyanates, by radiation and thermal curing.

U.S. Pat. Nos. 4,618,658 and 4,719,268 describe polymer modified epoxy resin compositions comprising the copolymerization product of an epoxy resin wherein part of the epoxide groups have been modified to provide polymerizable ethylenic unsaturation; a vinyl-terminated urethane oligomer; and a polymerizable ethylenically unsaturated compound such as styrene or an acrylate ester.

U.S. Pat. No. 4,742,128 discloses compositions for molded products consisting of an interpenetrating polymer network comprising a polyamide and a polyurethane.

U.S. Pat. No. 4,752,624 describes an interpenetrating polymer network for selective permeation membranes comprising a hydrophilic and a hydrophobic polymer component. The hydrophilic component is made from hexamethylene diisocyanate and polyethylene ether glycol, and cross-linked with trimethylolpropane. The hydrophobic polymer component is polystyrene cross-linked with divinylbenzene.

U.S. Pat. No. 4,766,183 discloses a heat-curable composition comprising a urethane/epoxy/silicone interpenetrating polymer network.

U.S. Pat. No. 4,824,919 describes vinyl ester/styrene composition flexibilized by the addition of a small amount of polyurethane.

U.S. Pat. No. 4,902,737 discloses a resin having improved impact properties comprising an aromatic carbonate resin/polyester blend modified by the addition of a first elastomeric phase of cross-linked polyacrylate, and a second phase of cross-linked styrene/acrylonitrile.

U.S. Pat. No. 4,923,934 discloses a coating having improved flexibility, resistance to chemical attack and corrosion, and adhesion, consisting of an interpenetrating polymer network including a blocked urethane prepolymer, a polyol, an epoxy resin, and an epoxy catalyst.

U.S. Pat. No. 4,957,981 describes a polymeric material to be used for optical products such as lenses, goggles, and watch covers comprising an interpenetrating polymer network of a polyol(allylcarbonate) and an epoxy resin.

U.S. Pat. No. 4,992,506 provides a molding composition having improved flexural modulus and softness (lower modulus) comprising an interpenetrating polymer network of one or more thermoplastic copolyetheresters, one or more aromatic thermoplastic polyesters, a rubbery polymer comprising cross-linked (meth)acrylate, and an interpenetrating cross-linked styrene resin, and, optionally, a mineral filler.

SUMMARY OF THE INVENTION

The acoustic damping properties of viscoelastic polymeric materials render them most effective in their glass transition temperature range where the material changes from hard, glass-like to soft, rubbery consistency. For a specific polymeric material, the glass transition temperature range is centered about a characteristic temperature for that material. For most polymeric materials, the glass transition temperature range is on the order of 20 degrees C. (see curve labeled 100/0 in FIG. 1). This temperature range is where the polymeric material provides its maximum acoustic damping, however, it frequently occurs at temperatures which are either lower or higher than the temperature range in which a high degree of acoustic damping is desired from an applications standpoint. Efforts have therefore been made to broaden the glass transition temperature range and to shift it to a designated temperature range such that a high degree of acoustic damping is achieved at temperatures at which acoustic damping ordinarily is low. The present invention provides a viscoelastic material interpenetrating polymer network having a broadened glass transition temperature range and, therefore, improved acoustic damping over a broad range of temperatures (see curves labeled 70/30, 60/40 and 50/50 in FIG. 1).

The ability of viscoelastic materials to dampen noise and vibration is related to their complex Young's modulus $$E^* = E' + iE'',$$

where $E'$ is the real, elastic, or in-phase modulus, and $E''$ is the imaginary, viscous, loss, or out-of-phase modulus; $i = \sqrt{-1}$. A measure of the mechanical energy dissipation as heat in a viscoelastic material is the ratio $E''/E'$, which is also referred to as the damping factor, tangent delta. It is experimentally determined at 10 Hz with a mechanical thermal analyzer, such as the Polymer Laboratory Dynamic Mechanical Thermal Analyzer. All polymer systems exhibit a maximum value for tan delta, and hence maximum vibration damping, in their glass transition temperature range.

Interpenetrating polymer networks are chemically dissimilar cross-linked polymer chains which have substantially no chemical bonding between them. They are prepared by allowing two sets of polymer precursors to polymerize in each other's presence, either simultaneously or sequentially, whereby two cross-linked polymer networks form which are intimately entangled with each other on a molecular scale.

It has now been found that, by the choice of appropriate polymer components and polymer component ratios, interpenetrating polymer networks may be produced whose glass transition is broadened and shifted to a preferred temperature range. Such interpenetrating polymer networks, as for example the interpenetrating polymer network of the present invention, have increased acoustic damping factors in the temperature range in which they are to be used for acoustic damping.

The object of this invention therefore is to provide interpenetrating polymer networks having novel compositions, broadened glass transition temperature ranges, and increased acoustic damping factors in designated temperature ranges. A further object of this invention is to provide processes for preparing such interpenetrating polymer networks.

One component of the interpenetrating polymer networks of this invention is a soft polymer, and the other component is a hard polymer. The soft polymer component of the interpenetrating polymer network of this invention is a polyurethane prepared from one or several diisocyanates and a polyalkylene ether glycol, cross-linked using a polyol. The diisocyanates most commonly used are 4,4'-diphenylmethane diisocyanate, and 2,4 and 2,6-toluene diisocyanate, the latter two most commonly as an isomer mixture. Polyalkylene ether glycols such as polyethylene ether glycols, polpropylene ether glycols, and poly tetramethylene ether glycols may be used, the latter, with a molecular weight between about 650 and about 2000, being preferred. The polyurethane precursors are polymerized in the presence of a chain extender and a cross-linking agent. As a chain extender, 1,4-butanediol is preferred. Cross-linking is achieved by the addition of 1,1,1-trimethylol propane.

The hard polymer component of the interpentrating polymer network of this invention is a vinyl ester polymer produced by polymerization of a vinyl ester resin such as the ester of an ethylenically unsaturated carboxylic acid, e.g. acrylic or methacrylic acid, and a polyglycidyl ether of polypenols such as 2,2-bis(4-hydroxyphenyl) propane (bisphenol A); 4,4'-dihydroxy diphenylmethane; 4,4'-dihydroxy benzophenone; 1,1-bis(4-hydroxyphenyl) ethane, and other similar polyphenols. The polygycidyl ethers are made by reacting epichlorohydrin with the polyphenols in presence of alkali. The resin mixture may contain 40–50 weight percent of styrene monomer. A commercially available vinyl ester resin of this type, Hetron 980, is made by Ashland Chemical. A brominated vinyl ester resin, such as DERAKANE 510A, from Dow Chemical Company, may optionally be used; it confers increased fire retardance upon the interpenetrating polymer network.

The vinyl ester polymer precursors are polymerized in the presence of curing agents and promoters such as methylethyl ketone peroxide and cobalt naphthenate. The mixture is then cured at room temperature from 12 to 20, preferably about 16 hours.

The interpenetrating polymer network of this invention has an extended glass transition range when the weight percentage of soft polymer component ranges from 50 to 90, and that of the hard polymer component ranges from 50 to 10. Its damping factor, tangent delta, reaches a high value in a broad range from about 15 to about 85 degrees C. when the weight ratio of soft to hard polymer component is about 70/30.

Broadened glass transition temperature is achieved by virtue of the vinyl ester polymer being cross-linked in the presence of polyurethane, but without chemical interference by the polyurethane, to produce microphase separation between the polyurethane and vinyl ester components. The polyurethane precursors are polymerized in the presence of their chain extender and cross-linking agent and the vinyl ester polymer precursors are polymerized in the presence of their promoter and curing agent, however, no cross-linking results between the polyurethane and the vinyl ester polymer. This result produces a morphology of polymer networks with microphase domains and entanglement on a molecular scale that produce broad glass transition temperatures. However, as shown in FIG. 1., by broadening the glass transition temperature, the peak damping (peak tan delta) is reduced. The results is a polyurethane/vinyl ester interpenetrating polymer network having improved acoustic damping characteristics over a broad temperature range. Thus the invention allows damping from a low temperature to a high temperature without the necessity of changing materials for different uses in different temperature ranges.

DESCRIPTION OF PREFERRED EMBODIMENTS OF THE INVENTION

Figure 1:
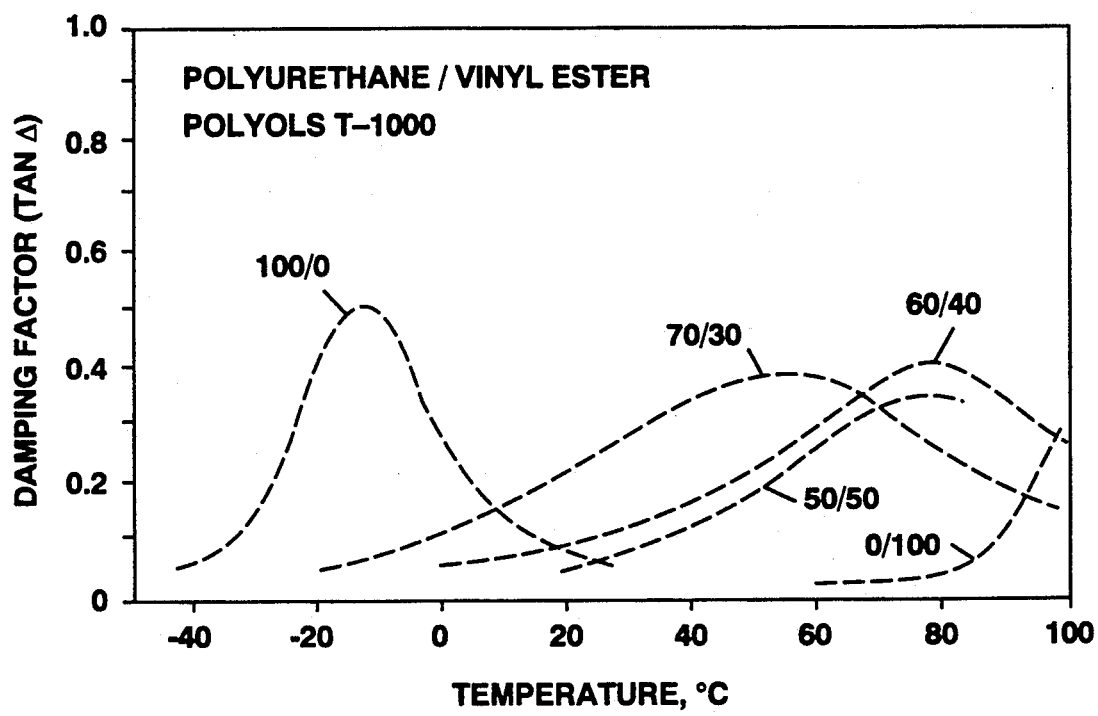
FIG. 1 illustrates the damping factor, tangent delta, as a function of temperature, for interpenetrating polymer networks in accordance with this invention, as well as for the pure polyurethane and vinyl ester polymers.

In the following detailed description of the preferred embodiments of this invention, the following abbreviations will be used to identify the materials used:
Polyols T-1000, polytetramethylene ether glycol, molecular weight about 1000, DuPont
Isonate 125M, 4,4'-diphenylmethane diisocyanate, Dow Chemical TMP, 1,1,1-trimethylol propane; BDO, 1,4-butanediol, DuPont Hetron 980, vinyl ester resin, Ashland Chemical CON, cobalt naphthenate 6%, Mooney Chemicals MEKP, methylethyl ketone peroxide, Lupersol DDM-9

In the following examples, these materials are combined between 50 and 60 degrees C. to assure a suitably low viscosity for mixing.

EXAMPLE 1

This example illustrates the preparation of pure polyurethane polymers. 19.6 parts of Polyols T-1000 are dried by heating to 100–110 degrees C. and being held under vacuum for an hour; and cooled to 60 degrees C. 10.7 parts of Isonate 125M are preheated to 50 degrees C. and added to the polyols T-1000, and the mixture is agitated under vacuum for 10 minutes at 60 degrees C. 0.21 parts of TMP are added and the mixture is agitated for three minutes. 1.5 parts of BDO are added and the mixture is further agitated for 5 minutes. The mixture is then poured into a mold and allowed to cure at room temperature for 16 hours. The damping factor, tangent delta, of this polymer, is shown in FIG. 1 identified as "100/0". The damping factor reaches a peak at approximately −15 degrees C.

EXAMPLE 2

This example illustrates the preparation of pure vinyl ester polymer. Ten parts of Hetron 980 and 0.01 parts of CON are mixed. 0.125 parts of MEKP are added, and the mixture is poured into a mold and allowed to cure at room temperature for sixteen hours. The damping factor, tangent delta, of this polymer, is shown in FIG. 1 identified as "0/100". Its damping factor is very low up to about 80 degrees C. and rises sharply above 80 degrees.

EXAMPLE 3

This example illustrates the preparation of an interpenetrating polymer network having the weight ratio of soft to hard polymer component of 70/30. In a first vessel, 19.6 parts of polyols T-1000 are dried by heating to 100-110 degrees C. and being held under vacuum for four hours; and cooled to 55 degrees C. 10.7 parts of Isonate 125M, preheated to 55 degrees C., are added and the mixture is agitated under vacuum for 10 minutes. 0.21 parts of TMP and 1.5 parts of BDO are then added with agitation while the mixture is maintained at 55 degrees C. In a second vessel, 13.54 parts of Hetron 980 are mixed with 0.014 parts of CON and 0.17 parts of MEKP. The contents of the second vessel are poured into the contents in the first vessel with vigorous agitation, and the mixture is degassed under vacuum for 10 minutes to remove any dissolved air. The mixture is poured into a mold and allowed to cure at room temperature for 16 hours. The damping factor, tangent delta, of this interpenetrating polymer network is shown in FIG. 1 identified as "70/30". It is seen to have a high damping factor, in excess of 0.2, from about 15 to about 85 degrees C.

EXAMPLES 4 AND 5

Interpenetrating polymer networks having weight ratios of soft to hard polymer component of 60/40 and 50/50 are made substantially as described in Example 3 above, with the ingredient ratios appropriately modified. Their damping factors, tangent delta, are shown in FIG. 1 also. While they represent an improvement in terms of damping factor over the pure polymer components, it is apparent that their damping factors peak at relatively high temperatures.

Other modifications of this invention will be apparent to those skilled in the art, all falling within the scope of the invention as described herein and claimed in the following claims.

What is claimed is:

1. An acoustic damping material providing improved acoustic damping over a broad temperature range, comprising:

an interpenetrating polymer network having a soft polymer component made of polyurethane, said soft polymer component comprising from about 60 to about 70 weight percent of said interpenetrating polymer network, and a hard polymer component made of a vinyl ester polymer, said hard polymer component comprising from about 40 to about 30 weight percent of said interpenetrating polymer network; and wherein each of said polyurethane and said vinyl ester polymer are polymerized in the presence of the other and then cured at room temperature from about 12 to about 20 hours, whereby said interpenetrating polymer network has an acoustic damping factor in excess of 0.2 over a temperature range of from about 15 to about 85 degrees C. with the peak acoustic damping factor at about 55 degrees C. when the soft polymer component comprises about 70 weight percent of said interpenetrating polymer network and said interpenetrating polymer network has an acoustic damping factor in excess of 0.2 over a temperature range of from about 45 to about 105 degrees C. with the peak acoustic damping factor at about 80 degrees C. when the soft polymer component comprises about 60 weight percent of said interpenetrating polymer network.

2. An acoustic damping material in accordance with claim 1 wherein said polyurethane is made by polymerization of an aromatic diisocyanate and a polyalkylene ether glycol in the presence of 1,4-butanediol and 1,1,1-trimethylol propane and said vinyl ester polymer is made by polymerization of a vinyl ester resin comprising the ester of an ethylenically unsaturated carboxylic acid and the diglycidyl ether of a polyphenol in the presence of cobalt naphthenate and methylethyl ketone peroxide.

3. An acoustic damping material in accordance with claim 2 wherein said aromatic diisocyanate is selected from the group consisting of 4,4'-diphenylmethane diisocyanate, 2,4,-toluene diisocyanate, 2,6,-toluene diisocyanate, and any mixture thereof.

4. An acoustic damping material in accordance with claim 2 wherein said polyalkylene ether glycol is selected from the group consisting of polyethylene ether glycol, polypropylene ether glycol and polytetramethylene ether glycol.

5. An acoustic damping material in accordance with claim 4 wherein said polytetramethylene ether glycol has a molecular weight between about 650 and about 2000.

6. An acoustic damping material in accordance with claim 2 wherein said ethylenically unsaturated carboxylic acid is selected from the group consisting of acrylic acid and methacrylic acid.

7. An acoustic damping material in accordance with claim 2 wherein said polyphenol is selected from the group consisting of 2,2-bis(4-hydroxyphenyl)propane, 4,4'-dihydroxy diphenylmethane, 4,4'-dihydroxy benzophenone, and 1,1-bis(4-hydroxyphenyl)ethane.

8. An acoustic damping material in accordance with claim 2 wherein said vinyl ester resin is brominated, whereby increased fire retardance is conferred upon said interpenetrating polymer network.

* * * * *